United States Patent [19]
Shimizu

[11] Patent Number: 6,002,915
[45] Date of Patent: Dec. 14, 1999

[54] MANAGEMENT SYSTEM FOR INTERACTIVE ON-LINE SYSTEM

[75] Inventor: Takuji Shimizu, Ibaraki, Japan

[73] Assignee: Cyber School Japan Co., Ltd., Tokyo, Japan

[21] Appl. No.: 08/837,090

[22] Filed: Apr. 14, 1997

[30] Foreign Application Priority Data

Nov. 22, 1996 [JP] Japan .................................. 8-325940

[51] Int. Cl.⁶ ...................................................... G09B 3/00
[52] U.S. Cl. .......................... 434/350; 434/362; 434/322
[58] Field of Search ................................. 434/350, 322, 434/362

[56] References Cited

U.S. PATENT DOCUMENTS

| | | | |
|---|---|---|---|
| 4,807,155 | 2/1989 | Cree et al. ............................... | 395/329 |
| 4,820,167 | 4/1989 | Nobles et al. ........................... | 434/336 |
| 5,002,491 | 3/1991 | Abrahamson et al. .................. | 434/322 |
| 5,310,349 | 5/1994 | Daniels et al. ........................... | 434/350 |
| 5,808,894 | 9/1998 | Wiens et al. ....................... | 394/479.01 |
| 5,819,043 | 10/1998 | Baugher et al. ......................... | 709/222 |
| 5,823,788 | 10/1998 | Lemelson et al. ....................... | 434/350 |
| 5,826,082 | 10/1998 | Bishop et al. ............................ | 709/104 |
| 5,832,451 | 11/1998 | Flake et al. ................................... | 705/5 |
| 5,838,968 | 11/1998 | Culbert .................................... | 709/104 |
| 5,842,173 | 11/1998 | Strum et al. .................................. | 705/1 |
| 5,933,417 | 8/1999 | Rottoo ..................................... | 370/260 |
| 5,933,810 | 8/1999 | Okawa .......................................... | 705/5 |
| 5,940,071 | 8/1999 | Treffers et al. .......................... | 345/327 |
| 5,940,803 | 8/1999 | Kanemitsu .................................. | 705/6 |

*Primary Examiner*—Valencia Martin-Wallace
*Assistant Examiner*—David A. Fleming
*Attorney, Agent, or Firm*—Leydig, Voit & Mayer

[57] ABSTRACT

In an interactive on-line system, a registration management system mounted on a server 10 includes a teaching affairs management system which registers information on teaching subjects, teaching schedules and teachers, and a reservation management system includes a lecture booking system which provides a trainee of the information registered in the teaching affairs management system in an on-line state when the trainee books a lecture and manages the information on the teaching subject, teaching schedule and teacher selected by the trainee. According to the registration management system, the booking state of lectures or the like inputted from the terminal of each user and such service resources as the teaching subject, teaching schedule or the like which can be supplied to users are easily managed.

4 Claims, 9 Drawing Sheets

Upper Box : Number of Instructors
Lower Box : Booth Box No.

| Aug/30/Fri 3 10:30~12:00 am |
| Aug/30/Fri 2 8:45~10:15 am |

| Aug/30/Fri 1 7:00~8:30 am | | | | |
|---|---|---|---|---|
| | Introduction | First Grade | Second Grade | |
| Windows 95 | 2<br>A1,A2 | 1<br>A3 | | |
| Ichitaro W/P | 4<br>A4,A5,A6,A7 | 2<br>A8,B1 | | |
| Word | 1<br>B2 | 3<br>B3,B4,B5 | | |
| Lotus 1-2-3 | 3<br>B6,B7,B8 | 3<br>C1,C2 | | |
| Excel | 2<br>C3,C4 | 2<br>C5,C6 | | |

F I G. 5A

| Box NO. | Tel 1 | Tel 2 | Tel 3 | Tel 4 | Tel 5 | Tel 6 |
|---|---|---|---|---|---|---|
| 1 | 5351-1234 | 5351-1235 | 5351-1236 | 5351-1237 | 5351-1238 | 5351-1239 |
| 2 | 5351-2234 | 5351-2235 | 5351-2236 | | | |
| 3 | | | | | | |
| 4 | | | | | | |

F I G. 5B

| Instructor : Miss.E.Nakamura | Instructor No. 34567 |
|---|---|
| Reservation Ratio 85% | Repeat Ratio 32% |
| Ichitaro Introduction  Ranck A<br>Ichitaro First Grade  Ranck A | Booth Management |

F I G. 5C

Lecture Registration List

| | Lecture | Sub-Lecture |

1996.AUG

| MON | TUE | WED | THU | FRI | SAT | SUN |
|-----|-----|-----|-----|-----|-----|-----|
|     |     |     | 1   | 2   | 3   | 4   |
| 5   | 6   | 7   | 8   | 9   | 10  | 11  |
| 12  | 13  | 14  | 15  | 16  | 17  | 18  |
| 19  | 20  | 21  | 22  | 23  | 24  | 25  |
| 26  | 27  | 28  | 29  | 30  | 31  |     |

| 1 | 7 : 00 |
| 2 | 8 : 45 |
| 3 | 10 : 30 |
| 4 | 12 : 15 |
| 5 | 14 : 00 |
| 6 | 15 : 45 |
| 7 | 18 : 00 |
| 8 | 19 : 45 |
| 9 | 21 : 30 |

|              | Ichitaro | Word | 1-2-3 |
|--------------|----------|------|-------|
| Introduction |          |      |       |
| First Grade  |          |      |       |
| Second Grade |          |      |       |
|              |          |      |       |

*F I G. 6C*

---

| Instructor Lecture Management (R.Yoshida) | Reservation Ratio 72% | Repeat Ratio 20% |
| Instructor Lecture Management (E.Nakamura) | Reservation Ratio 85% | Repeat Ratio 32% |

July/18 10 : 30   Ichitaro Introduction   E.Nakamura 34567   Booth Box NO.4   3

July/20 12 : 15   Ichitaro Introduction   E.Nakamura34567   Booth Box NO.8   4

July/29 10 : 30   Ichitaro Introduction   E.Nakamura34567   Booth Box NO.6   C

Aug/30 10 : 30   Ichitaro First Grade   E.Nakamura34567   Booth Box NO.1   [1][2][3][4][5][6]

MANAGEMENT SYSTEM FOR INTERACTIVE ON-LINE SYSTEM

BACKGROUND OF THE INVENTION

1. Field of the Invention

This invention relates to a management system which is used for an interactive on-line system such as the teaching system and the like, using a communication network and which manages reservations and the like inputted from users through their terminals and service resources and the like which can be supplied to the users.

2. Description of the Related Art

In recent years, there becomes such a problem that users who have purchased personal computers cannot use the personal computers themselves or cannot master application programs in proportion as personal computers are popularized. In order to solve such problem, manufacturers, distributors, software houses or the likes are opening classrooms for teaching how to use personal computers. Users who feel it difficult to study how to use personal computers by themselves are attending the classrooms.

However, the learning effect of each user is not so high, because such classrooms teach many trainees at the same time usually. In addition, the users cannot select the classrooms freely because dates and hours when the classrooms open and places where the classrooms locate are fixed. Therefore, the users must meet fixed conditions of the classrooms.

Even when a lecture is given on a one-to-one basis for a user, the user must go to the place of the classroom or a teacher must go to the place of the user. As a result, the user must pay a high fee.

On-line teaching courses on various subjects increase with the progress of communication networks. When a user takes one of the teaching courses, he is not required to go to the place of the course and the service offering side can provide him with teaching service at relatively free time.

However, any on-line teaching systems having a high degree of freedom in the teaching time has a difficulty in the management of curriculum programs, etc. Especially, when the scale of the teaching system becomes larger, it becomes difficult to match the teaching subjects and teaching hours desired by users to the expertise and available hours of teachers.

SUMMARY OF THE INVENTION

This invention is achieved to solve such problem by providing a management system which manages reservation conditions including reservations of lectures inputted from users through their terminals and service resources including teaching subjects, teaching hours and the like which can be supplied to the users to the above-mentioned interactive on-line system.

The management system for interactive on-line system of this invention is a management system which is applicable to such an interactive on-line system that assigns service resources to the requesters out of a plurality of interactive service resources The assigned service resources are conformable to the booking conditions requested by service requesters. The management system comprises a registration management system which registers each service resource, and reservation management system which assigns service resources conformable to the booking conditions of the service requesters to the requesters by referring to the information registered in the registration management system.

When this management system is applied to an on-line teaching system, the registration management system includes, for example, a teaching affairs management system which registers information on teaching subjects, teaching schedules and teachers. The reservation management system contains, for example, a lecture booking system which provides a trainee with the information registered in the teaching affairs management system when the trainee requests the system to reserve a lecture and manages information on the teaching subject, teaching schedule and teacher selected by the trainee.

BRIEF DESCRIPTION OF THE DRAWINGS

FIGS. 5A to 5C show explanatory drawings indicating examples of the data prepared by the teaching affairs management system, respectively.

FIGS. 6A to 6D show explanatory drawings indicating the registering state of the teacher information, respectively.

FIGS. 7A to 7C show explanatory drawings indicating the booking states of lectures, respectively.

DETAILED DESCRIPTION OF THE PREFERRED EMBODIMENTS

Figure 1:
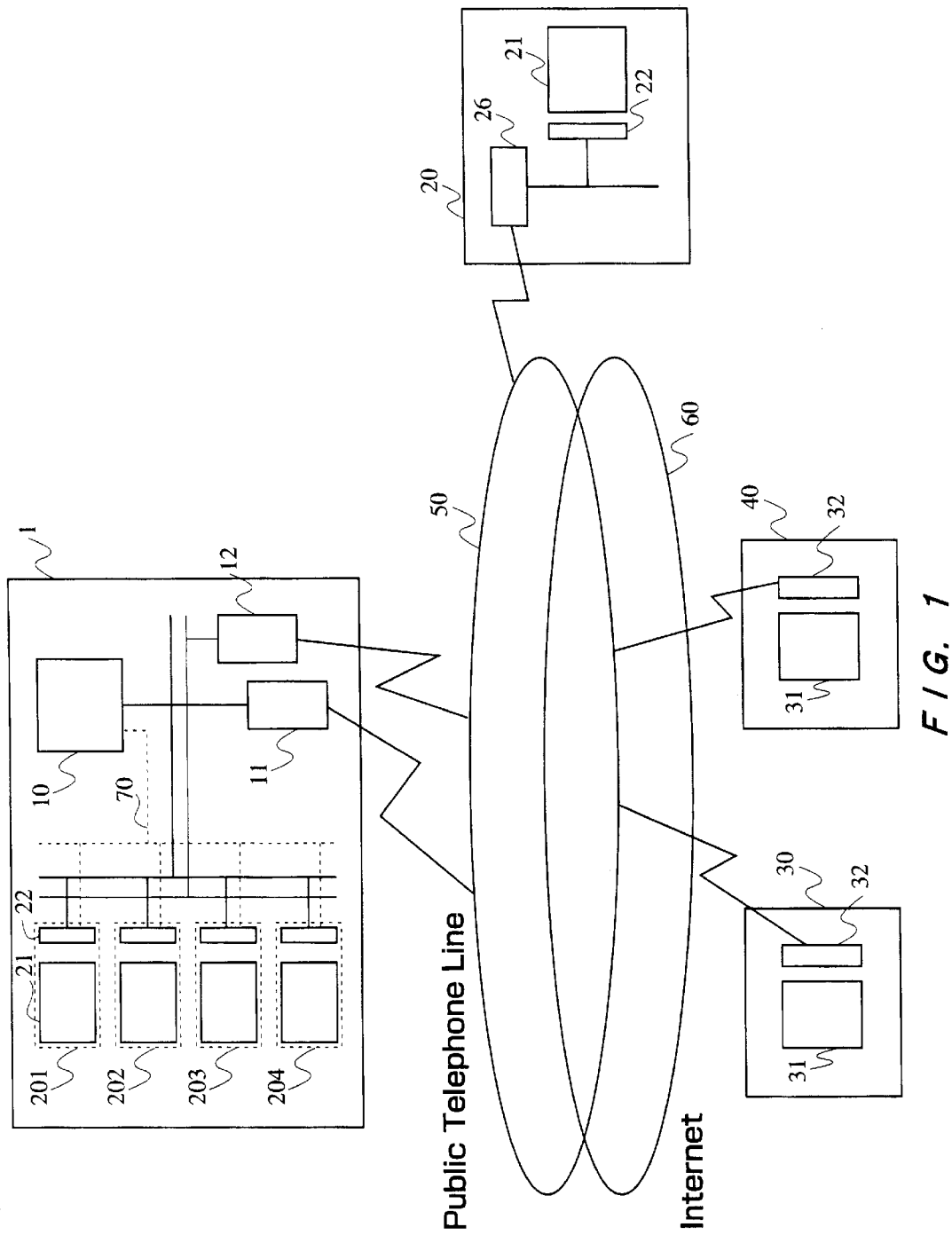
FIG. 1 shows a system structure of an interactive on-line system to which the management system of the present invention is applied.

FIG. 1 shows a system structure of an interactive on-line system to which the management system of this invention is applied. The system shown in FIG. 1 is an interactive on-line teaching system in which a teacher who operates a home or satellite teacher system 20 or teachers who operate teacher systems 201–204 provided in a school 1 are connected to the trainees who operate trainee systems 30 and 40 through a public telephone network 50 or computer inter-network 60.

Each of the teacher systems 20 and 201–204 comprises a personal computer 21 and accessory system 22 for example. The accessory system 22 includes a camera, microphone, loudspeaker and MODEM, DSU or the like. Each of the trainee systems 30 and 40 comprises a personal computer 31 and accessory system 32 for example. The accessory system 32 includes a camera, microphone, loudspeaker and MODEM, DSU or the like. Although only two trainee systems 30 and 40 are shown in FIG. 1, more systems for trainee can be connected to the system 20 or systems 201–204 for teacher.

The trainee systems 30 and 40 are connected to a server 10 through the internet 60. The teacher systems 201–204 are connected to the server 10 through a LAN 70. FIG. 1 also shows a router 11 connected between the server 10 and internet 60 and terminal blocks connected between the telephone network 50 and the teacher systems 20 and 201–204.

Figure 2:
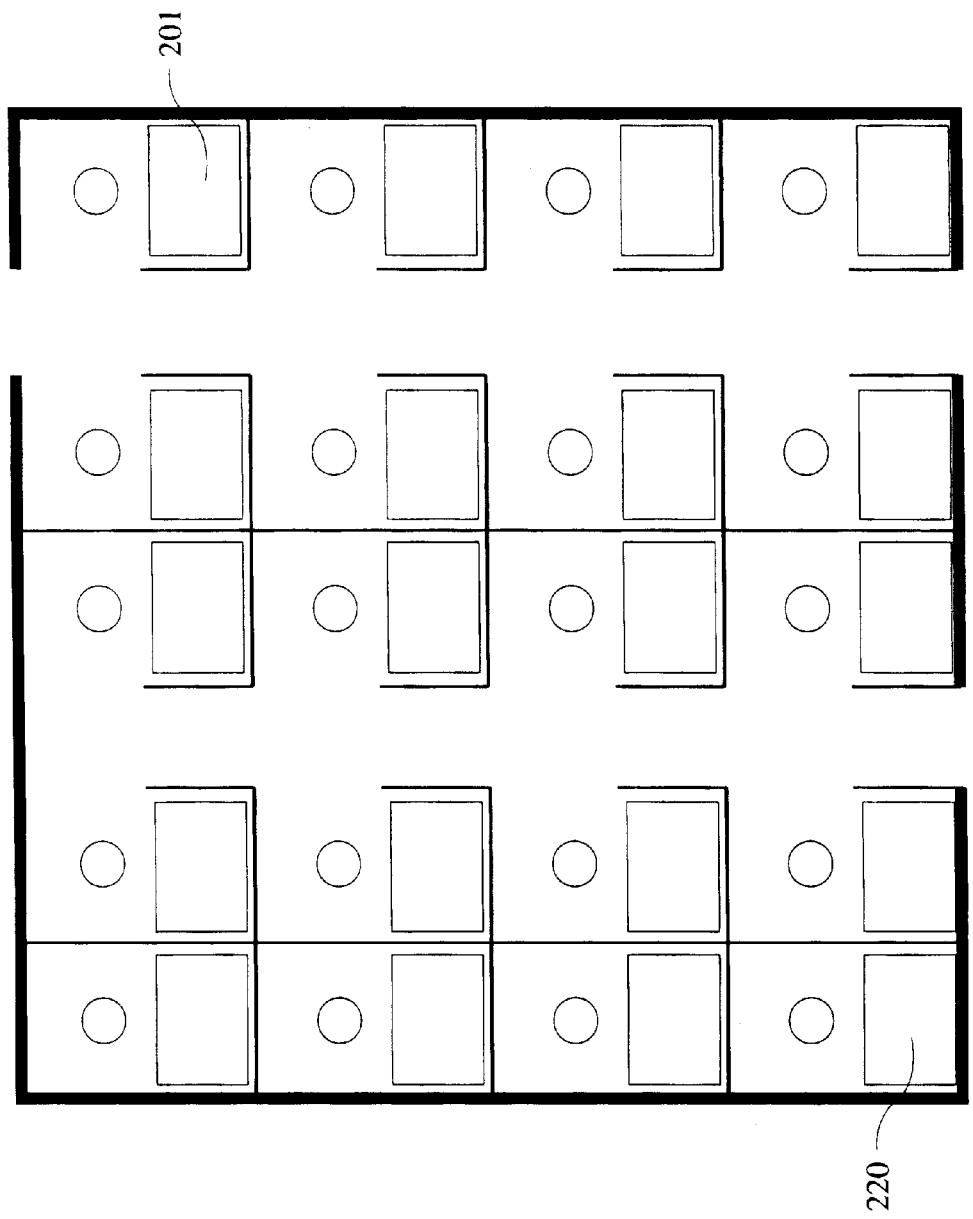
FIG. 2 shows a top view showing a classroom to which systems 201–220 for teacher are installed.

FIG. 2 shows a plan view showing an example of a school (classroom) in which teacher systems 201–220 are installed to each training booth. Many telephone lines (not shown in the figure) are led in the classroom. When one teacher teaches a maximum of six trainees at the same time, a total of 120 (20×6) telephone lines must be led in the classroom.

Figure 3:
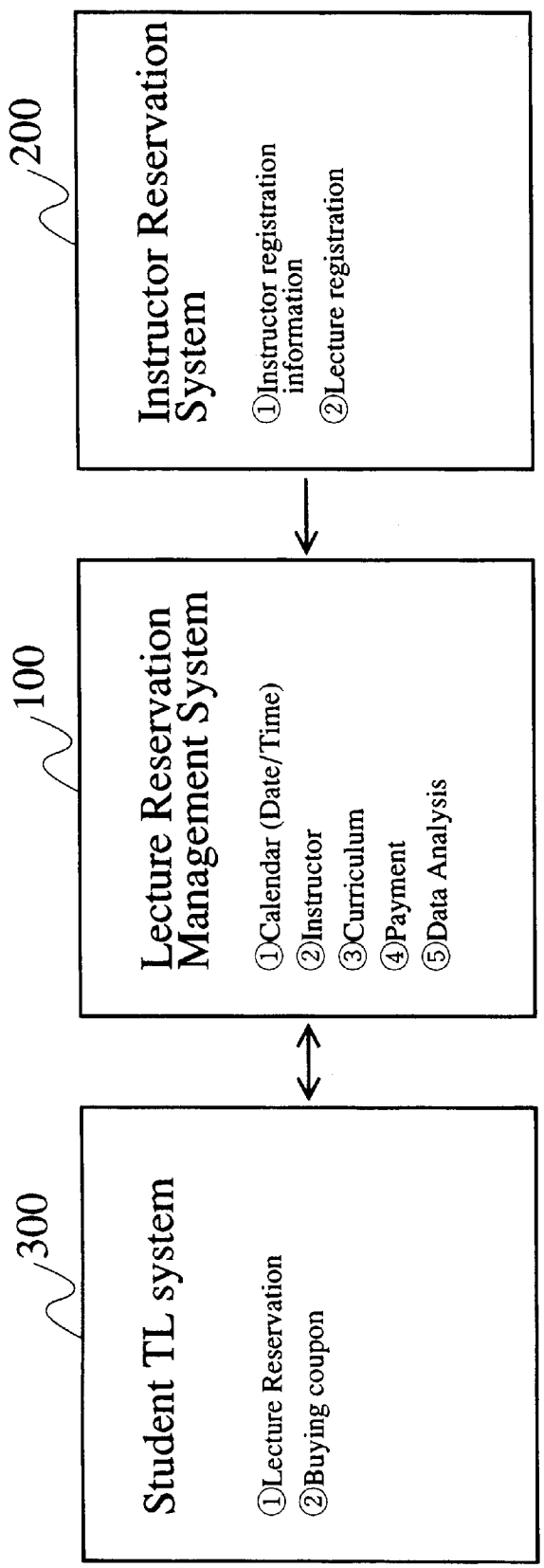
FIG. 3 shows a conceptual diagram indicating the outline of the management of lecture reservations by the management system of the present invention.

FIG. 3 shows a conceptual diagram showing the outline of the management of lecture reservations by the management system of this invention. A lecture reservation management system 100 mounted on a server 10 manages date and hour information, teachers, and curriculums. In addition, the system 100 includes a program for charging fees to trainees, demanding payment to trainees, and analyzing data on trainees and teachers. A teacher registering system 200 mounted on each teacher system 20 or 201–220 includes a program for inputting information on teachers and registering the lectures given by the teachers. A tele-learning system for trainee (TL system for trainee) 300 mounted on each trainee system 30 or 40 includes a program used by trainees when they book a lecture or purchases a coupon.

Figure 4:
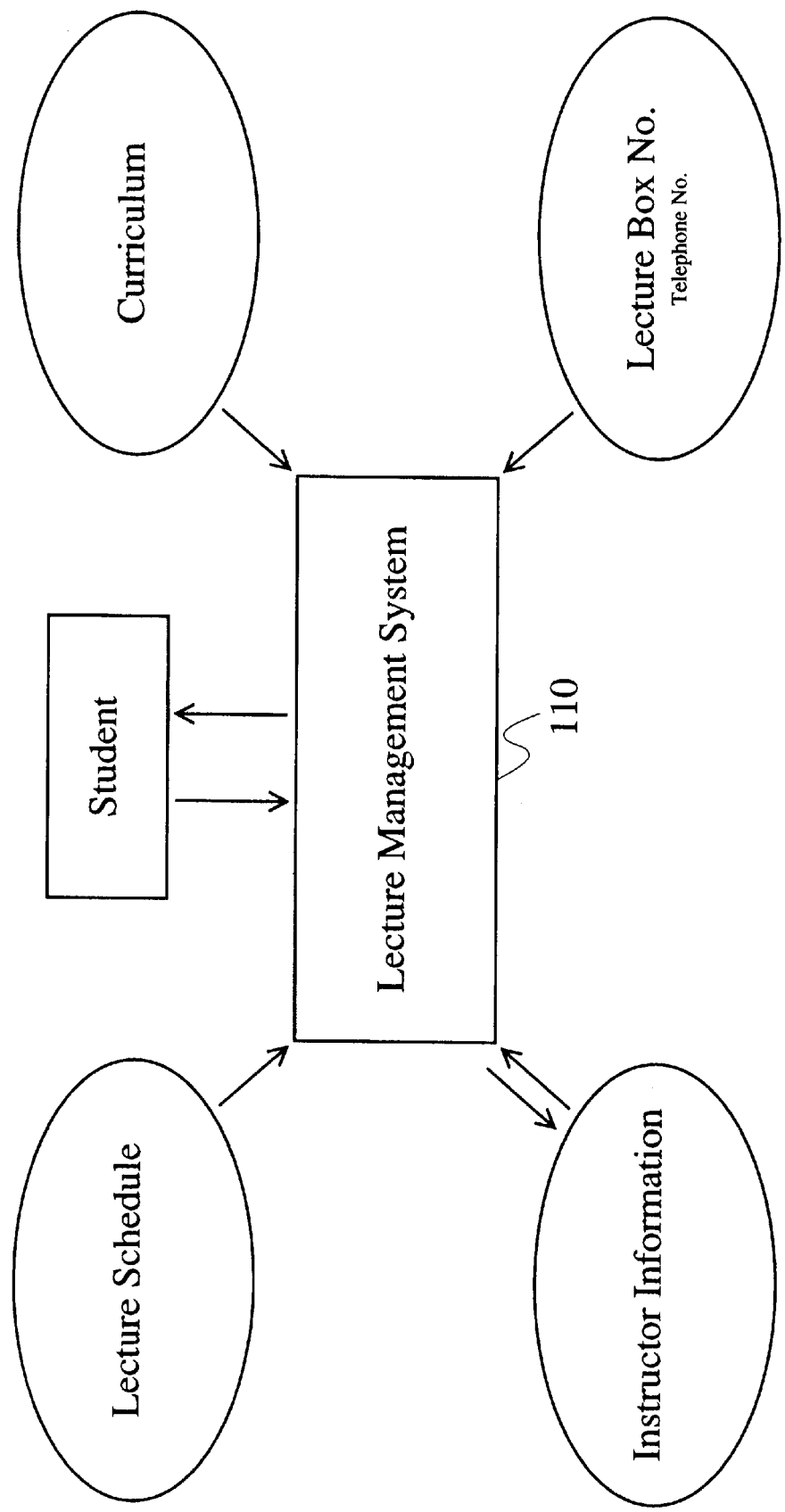
FIG. 4 shows a conceptual diagram showing the outline of the teaching affairs management system.

FIG. 4 shows a conceptual diagram showing the outline of the teaching affairs management system. The teaching affairs management system 110 mounted on the server 10 is realized as a program which manages the registration of curriculums, information on teaching booths, teaching schedules, and conditions of teachers.

Now, the operation of the interactive on-line teaching system is explained.

When a manager inputs a teaching schedule and curriculum to the teaching affairs management system 110, the system 110 prepares such a teaching affairs management plan as that shown in FIG. 5A for example. FIG. 5A shows that two teachers are assigned to the entrance course of Windows 95 and one teacher is assigned to the junior course of Windows 95 in a time zone from 7 o'clock to a half past 8 o'clock. When one teacher teaches six trainees at the same time, a total of twelve trainees (2×6=12) can attend the entrance course of Windows 95 in the time zone. This figure also shows that the indicated numbers of teachers are respectively assigned to the courses of Ichitaro, WORD, 1-2-3 and EXCEL. Here, Windows, Ichitaro and 1-2-3 are trademarks of Microsoft Corporation, Just System Co. Ltd. and Lotus Development Co., Ltd., respectively.

Figures 6A, 6B:
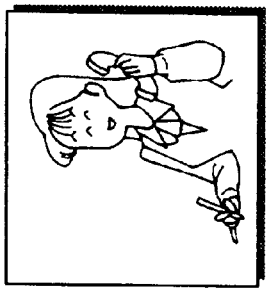

The teacher registering system 200 mounted on the teacher system 20 receives such a registering home page as that shown in FIG. 6A from the server 10 in accordance with the operation of a teacher. Then, the teacher prepares such a home page as that shown in FIG. 6B for propagating himself and registers the home page in the teaching affairs management system 110 in the server 10.

The manager also inputs in advance information on teaching booths to the teaching affairs management system 110. The information on teaching booths is the telephone numbers of the telephone lines led in each booth. Such a booth management table as that shown in FIG. 5B is prepared based on the inputted information on the teaching booths. The teaching affairs management system 110 manages the teacher information inputted from each teacher. For example, the system 110 prepares such a teacher setting table as that shown in FIG. 5C.

The teacher then registers the lectures he wants to give by pointing relevant points on such a page as that shown in FIG. 6C. The teaching affairs management system 110 prepares such a teacher and lecture management table as that shown in FIG. 6D on which teachers are correlated with teaching dates and hours, curriculums, and teaching booth numbers.

Figure 7A:
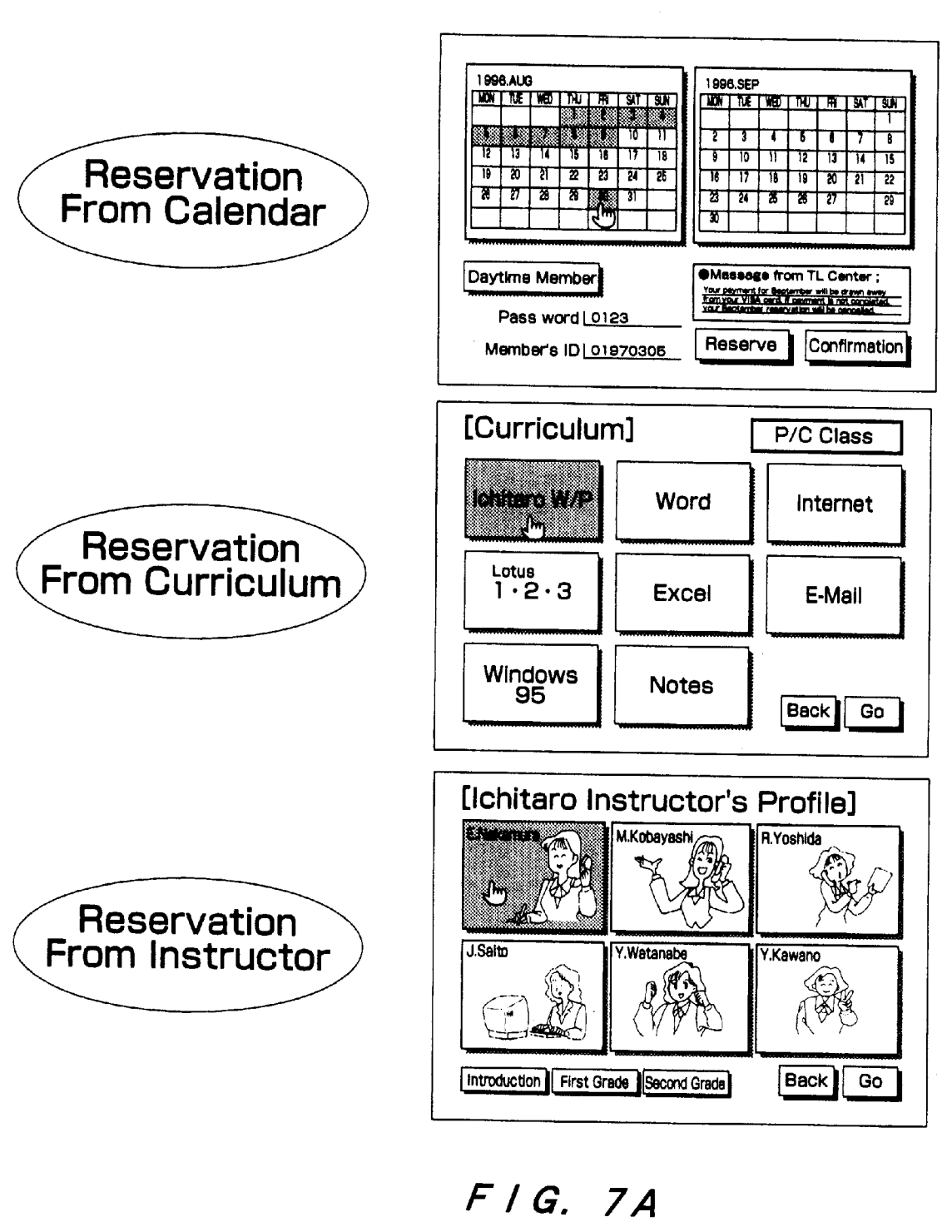
Figures 7B, 7C:
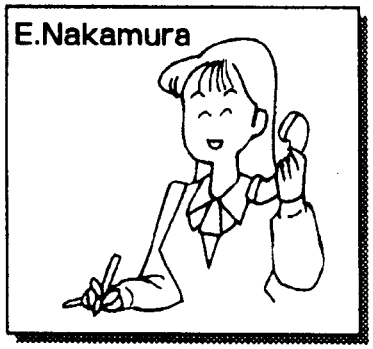

The TL system 300 for trainee mounted on each trainee system 30 or 40 receives a lecture booking home page from the server 10 in accordance with the operation of a trainee. The lecture reservation management system 100 on the server 10 provides the trainee with teaching affairs information as the lecture booking home page in the form meeting the conditions of the contract made with the trainee. As shown in FIG. 7A, the trainee can book a lecture by using date and hour, curriculum and/or teacher as a key word or key words. The trainee system for the trainee prepares such a lecture booking card as that shown in FIG. 7B based on the booking conditions. Namely, at first, the system for the trainee receives from the server 10 the date and hour, the curriculum, the teacher, and the telephone number of the teaching booth used by the teacher, which are assigned by the teaching affairs management system 200 based on the booking conditions, and secondly prepares the lecture booking card on which these received data are described. The teaching affairs management system 200 on the server 10 enters the booking conditions in the teaching affairs information. In other words, the system 200 makes the date and hour and the items regarding the teacher contained in the teaching affairs information to be reserved.

When a trainee books a lecture by inputting a date and hour as key words through his TL system 300 for trainee, the trainee is provided with the profile pages of available teachers assigned to the date and hour. Therefore, the trainee can select a suitable teacher based on the date and hour when the trainee desires. When the trainee books the lecture by inputting a curriculum as a key word, the trainee is provided with the profile pages of available teachers taking charges of the curriculum. Therefore, the trainee can select a suitable teacher based on the curriculum which the trainee requests. When the trainee books the lecture by inputting the name of a teacher as a key word, the trainee is provided with a page on which the dates and hours assigned to the teacher are clearly indicated. Therefore, the trainee can select a suitable date and hour based on the teacher whom the trainee requests.

The systems 30 and 40 for trainee automatically dial the telephone numbers described on lecture booking cards when booked dates and hours come. Therefore, the systems 30 and 40 are connected to the system for teacher in the teaching booth of a booked teacher through the public telephone network 60. The teacher gives lectures to trainees through the systems 30 and 40 in an on-line state. When the teacher teaches a plurality of trainees at the same time, the picture data transmitted from each trainee are simultaneously displayed in divided sections on the screen of the CRT 23 of the teacher system for example. In addition, the voice data transmitted from each trainee are outputted from the loudspeaker 26 of the teacher system. The voice data and picture data from the teacher are transmitted to each trainee system through the public telephone network 50.

When the lecture is finished, the lecture reservation management system 100 charges the fee of one curriculum to the trainee. When the trainee prepaid the fee of a series of lectures, such on-line lecture coupons as those shown in FIG. 7C are issued and one coupon is discarded as a used coupon.

The trainee can apply for supplementary lectures by additionally purchasing on-line lecture coupons. At the time of purchasing the on-line lecture coupons, the trainee receives such a lecture coupon page as that shown in FIG. 7C and makes purchasing operation on the page. The lecture reservation management system 100 on the server 10 increases the balance of the coupons of the trainee by the amount of the newly purchased coupons. Then, the trainee books the supplementary lectures in the same way as that described above. FIG. 7C shows that the trainee purchased coupons for 12 lectures out of which 2 lectures have been completed.

The lecture reservation management system 100 also evaluates each teacher. For example, at appropriate timing, the lecture reservation management system 100 calculates each ratio of the number of trainees who booked the lecture of each teacher to the full number of trainees which the teacher can teach. Each ratio indicates a lecture booking ratio of each teacher. The system 100 also calculates the ratio of the number of trainees who repeatedly booked the lecture of each teacher second and more times in case the trainees select the teacher by a key word of the teacher to the total number of trainees who booked each teacher. Each ratio indicates a repeating ratio of each teacher. The lecture booking ratio and the repeating ratio are used as a measure for evaluating each teacher. For example, the teaching affairs management system 110 enters the lecture booking ratio and repeating ratio in the teacher information as shown in FIG. 5C. In addition, the teaching affairs management system 110 revises the salary of each teacher based on the lecture booking ratio and the repeating ratio.

Since the on-line teaching system is constituted so that the lecture reservation management system 100 can supply each trainee with the teaching affairs information prepared by the teaching affairs management system 200 and each trainee can book lectures in an on-line state based on the teaching affairs information, and then, the system 200 can make lecture distribution, etc., by collating the lectures booked by the trainees with the teaching affairs information, the complicated management of teaching affairs can be executed automatically. Therefore, any teaching system can easily manage its teaching affairs even when the system becomes large in scale and the numbers of lectures, teachers, and trainees increase.

Although the systems 201–220 for teacher are collectively installed to a classroom in the above-explained example, it is possible to dispersively arrange the system 20 for teacher as shown in FIG. 1.

Although the on-line teaching system is cited in the above-explained example, in addition, the management system of this invention can be also applied to other interactive on-line systems. When, for example, the management system is applied to a medical examination booking system, the schedule of a medical doctor can be supplied to the terminals of patients, and the patients can reserve the doctor for medical examination based on the schedule.

When this invention is applied, therefore, a large-scale interactive on-line system can be managed easily at the time of operating the system by matching the information from the terminal side to the information from the manager side.

What is claimed is:

1. A management apparatus used in interactive on-line teaching for assigning conformable service resources to service requesters from a plurality of interactive service resources, the apparatus comprising:

a registration management apparatus which registers each service resource and including a teaching affairs management apparatus which registers information on teaching subjects, teaching schedules, and teachers; and a reservation management apparatus which assigns service resources conformable to the booking condition of the service requesters, to the requesters by referring registered resources in said registration management apparatus, said reservation management apparatus including a lecture booking apparatus which provides a trainee with the information registered in said teaching affairs management apparatus in an on-line state when the trainee makes a booking for a lecture and which manages information on a teaching subject, a teaching schedule, and a teacher selected by the trainee.

2. The apparatus according to claim 1, including:

a trainee apparatus mounted on an on-line terminal to be operated by a trainee, which provides the trainee with the information registered in said teaching affairs management apparatus, the information received from said lecture booking apparatus in the form of pictures, transmits the information on the teaching subject, the teaching schedule, and the teacher selected by the trainee to the lecture booking apparatus, and is automatically connected to a teacher terminal operated by a teacher in an on-line state when a booked date and hour occur.

3. The apparatus for an interactive on-line apparatus according to claim 1, including:

a teacher registering apparatus mounted on said teacher terminal, which receives the information on the teaching subject and the teaching schedule of the teacher from said teaching affairs apparatus, prepares a profile of the teacher in accordance with instructions from the teacher, inputs the teaching subject and the teaching schedule desired by the teacher, and transmits the profile of the teacher and the teaching subject and teaching schedule desired by the teacher to said teaching affairs management apparatus.

4. The apparatus for an interactive on-line apparatus according to claim 2, including:

a teacher registering apparatus mounted on said terminal, which receives information on the teaching subject and teaching schedule of the teacher from said teaching affairs apparatus, prepares a profile of the teacher in accordance with instructions from the teacher, inputs the teaching subject and the teaching schedule desired by the teacher, and transmits the profile of the teacher and the teaching subject and teaching schedule desired by the teacher to said teaching affairs management apparatus.

* * * * *